(12) United States Patent
Oliver (10) Patent No.: US 6,330,082 B1
(45) Date of Patent: Dec. 11, 2001

(54) CONVERTER FOR OPTICAL SCANNER

(75) Inventor: Thomas C. Oliver, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/143,686

(22) Filed: Aug. 28, 1998

(51) Int. Cl.$^7$ .................................................. H04N 1/024
(52) U.S. Cl. ........................................... 358/473; 358/474
(58) Field of Search ..................................... 358/473, 474, 358/448, 483, 497, 498, 500, 400, 505

(56) References Cited

U.S. PATENT DOCUMENTS

| | | | |
|---|---|---|---|
| 4,494,201 | 1/1985 | Reymond et al. | 364/449 |
| 4,723,297 | 2/1988 | Postl | 382/46 |
| 4,744,683 | * 5/1988 | Fischer | 400/146 |
| 4,797,544 | 1/1989 | Montgomery et al. | 250/221 |
| 4,882,629 | 11/1989 | Faulkerson et al. | 358/464 |
| 4,887,165 | 12/1989 | Sato et al. | 358/474 |
| 4,907,091 | * 3/1990 | Yoshida | 358/474 |
| 4,926,041 | 5/1990 | Boyd | 250/226 |
| 4,951,214 | 8/1990 | Hollister | 364/460 |
| 5,023,922 | 6/1991 | Abramovitz et al. | 382/59 |
| 5,089,712 | 2/1992 | Holland | 250/557 |
| 5,185,673 | 2/1993 | Sobol | 358/296 |
| 5,306,908 | 4/1994 | McConica et al. | 250/234 |
| 5,336,878 | 8/1994 | Boyd et al. | 250/208.1 |
| 5,339,107 | 8/1994 | Henry et al. | 348/270 |
| 5,355,146 | 10/1994 | Chiu et al. | 345/156 |
| 5,381,020 | 1/1995 | Kochis et al. | 250/566 |
| 5,410,141 | 4/1995 | Koenck et al. | 235/472 |
| 5,410,347 | 4/1995 | Steinle et al. | 348/270 |
| 5,414,251 | 5/1995 | Durbin | 235/462 |
| 5,497,150 | 3/1996 | Kimura et al. | 341/1 |
| 5,578,813 | 11/1996 | Allen et al. | 250/208.1 |
| 5,586,212 | 12/1996 | McConica et al. | 385/146 |
| 5,644,139 | 7/1997 | Allen et al. | 250/557 |
| 5,646,394 | 7/1997 | Steinle et al. | 250/208.1 |
| 5,664,243 | * 9/1997 | Okada | 396/246 |
| 5,777,715 | * 7/1998 | Kruegle | 351/158 |
| 5,847,845 | * 12/1998 | Kawasaki | 358/475 |
| 6,005,681 | * 12/1999 | Pollard | 358/473 |

\* cited by examiner

Primary Examiner—Jerome Grant, II
Assistant Examiner—Negussie Worku (57) ABSTRACT

A converter for an optical scanner of the type having a scanner linear photosensor array, a scanner imaging assembly which normally images a moving scan line portion of a closely adjacently positioned object onto the linear photosensor array including a converter imaging assembly having at least one optical element which cooperates with the scanner imaging assembly to image a scan line portion of a scene remote from said optical scanner onto said scanner linear photosensor array.

21 Claims, 6 Drawing Sheets

CONVERTER FOR OPTICAL SCANNER

BACKGROUND OF THE INVENTION

The present invention relates generally to optical scanners which are used to scan a closely adjacently positioned object such as a document and, more particularly, to a converter for an optical scanner which enables the scanner to scan a scene remote from the scanner.

Optical scanners which create electronic data representative of an image of a scanned object are known in the art. Flat bed scanners are stationary devices which have a transparent plate or platen upon which an object to be scanned, such as a paper document, is placed. The document is scanned by sequentially imaging narrow strip or scan line portions of the document on a linear optical sensor array such as a charge coupled device (CCD). The optical sensor array produces electronic data which is representative of each scan line portion of the document which is imaged thereon. In one type of flat bed scanner the current scan line portion of the document which is imaged on the sensor array is changed or "swept" by moving the platen supporting the document relative to the scanner imaging assembly. In another type of flat bed scanner the platen and document remain stationary and at least a portion of a imaging assembly is moved to change the scan line portion which is currently imaged. Flat bed scanners of the second type are sometimes provided with automatic document feeders (ADFs) which sequentially move sheet documents across a portion of the scanner platen. When an ADF is used, the portion of the imaging assembly which ordinarily moves during scanning remains stationary and relative movement between the document and imaging assembly is provided by the ADF. Flat bed scanners and ADF's are disclosed in the following patents, each of which is hereby incorporated by reference for all that is disclosed therein: Boyd et al., U.S. Pat. No. 4,926,041; Boyd et al., U.S. Pat. No. 5,336,878; Henry et al., U.S. Pat. No. 5,339,107, Steinle et al., U.S. Pat. No. 5,410,347; and Steinle et al., U.S. Pat. No. 5,646,394.

Portable or hand scanners, like flat bed scanners, generate electronic data representative of an image of an object by sequentially imaging scan line portions of the object. However hand scanners differ from flat bed scanners in that hand scanners produce relative movement between the scanned object and the scanner imaging assembly by displacing the entire scanner relative to the document. Hand scanners generally have an end portion which is adapted to be positioned in contact with the object which is to be scanned. An operator moves the scanner over the object keeping this end portion in contact with the object. Since the displacement between the scanner and the object is provided by the user rather than a fixed speed drive assembly such as contained on a flat bed scanner, a displacement sensing assembly is usually provided on a hand scanner in order to properly correlate and arrange the sequential scan line image data generated by the optical sensor array to enable reproduction of an accurate composite image of the object. Hand scanners and displacement sensing systems or navigation systems therefore are disclosed in the following patents, each of which is hereby specifically incorporated by reference for all that is disclosed therein: Allen et al., U.S. Pat. No. 5,644,139; McConica et al., U.S. Pat. No. 5,586,212 Allen et al., U.S. Pat. No. 5,578,813; Kochis et al., U.S. Pat. No. 5,381,020; McConica et al., U.S. Pat. No. 5,306,908; Reymond et al., U.S. Pat. No. 4,494,201; Postl, U.S. Pat. No. 4,723,297; Montgomery et al., U.S. Pat. No. 4,797,544; Hollister, U.S. Pat. No. 4,951,214; Abramovitz et al., U.S. Pat. No. 5,023,922; Holland, U.S. Pat. No. 5,089,712; Sobol, U.S. Pat. No. 5,185,673; Chiu et al., U.S. Pat. No. 5,355,146; and Kimura et al., U.S. Pat. No. 5,497,150.

Both flat bed scanners and hand scanners used to date require that an object which is to be imaged be positioned in touching contact with or in very close proximity with the object which is scanned. It would be generally desirable to provide a converter which would enable a flat bed scanner or a portable scanner to be used to scan objects positioned remotely from the scanner. It would be particularly desirable to provide such a converter for a portable scanner to enable the scanner to be used, in effect, as a portable digital camera as well as a portable optical scanner.

SUMMARY OF THE INVENTION

The present invention is directed to a converter for a scanner of the type which ordinarily is positioned in touching or near touching contact with an object to be scanned. The converter enables the scanner to scan a scene positioned remotely from the scanner.

Thus the invention may comprise a converter for an optical scanner of the type having a scanner linear photosensor array, a scanner imaging assembly which normally images a moving scan line portion of a closely adjacently positioned object onto the linear photosensor array. The converter includes a converter imaging assembly having at least one optical element which cooperates with the scanner imaging assembly to image a scan line portion of a scene remote from said optical scanner onto the scanner linear photosensor array.

The invention may also comprise a method of using a scanner, which is ordinarily used to scan an object positioned in close proximity to the scanner, to scan a scene which is positioned remotely from the scanner. The method may include maintaining the scanner at a fixed position relative to the scene and directing imaging light reflected from a first portion of the scene onto a predetermined portion of the scanner and, while maintaining the scanner at the fixed position relative to the scene, directing imaging light reflected from a second portion of the scene adjacent to the first portion of the scene onto the predetermined portion of the scanner.

The invention may also comprise a method of converting a proximate object optical scanner of the type having a linear photosensor array and an imaging assembly which normally images a moving scan line portion of a closely adjacently positioned object onto the linear photosensor array, into a remote scene scanner comprising attaching to the optical scanner a converter imaging assembly having at least one optical element which cooperates with the scanner imaging assembly to image a scan line portion of a scene remote from said optical scanner onto said scanner linear photosensor array.

DETAILED DESCRIPTION OF THE INVENTION

FIGS. 1–8, in general, illustrate a portable (hand-held) scanner 10 and a converter 110 therefor. The portable scanner 10 may be of the type having a scanner linear photosensor array 36, a scanner imaging assembly 22 which normally images a moving scan line portion of an adjacently positioned object 14 onto the linear photosensor array 36 as the portable scanner 10 is moved over the surface of the object 14 in close proximity thereto; a scanner navigation sensor assembly 24, 26 which senses movement of the portable scanner 10 over the scanned object 14; and a data processor 81 which receives and processes data from the linear photo sensor array 36 and the navigation sensor assembly 24, 26. The converter includes a converter imaging assembly 116, 128 having at least one optical element which cooperates with the scanner imaging assembly 22 to produce an image 37 of a scan line portion 115 of a scene 114 remote from the optical scanner 10 onto the scanner linear photosensor array 36.

Having thus described a convertor 110 for a portable scanner 10 in general, convertors and associated scanners, both hand-held and flat bed, will now be described in detail.

Figure 1:
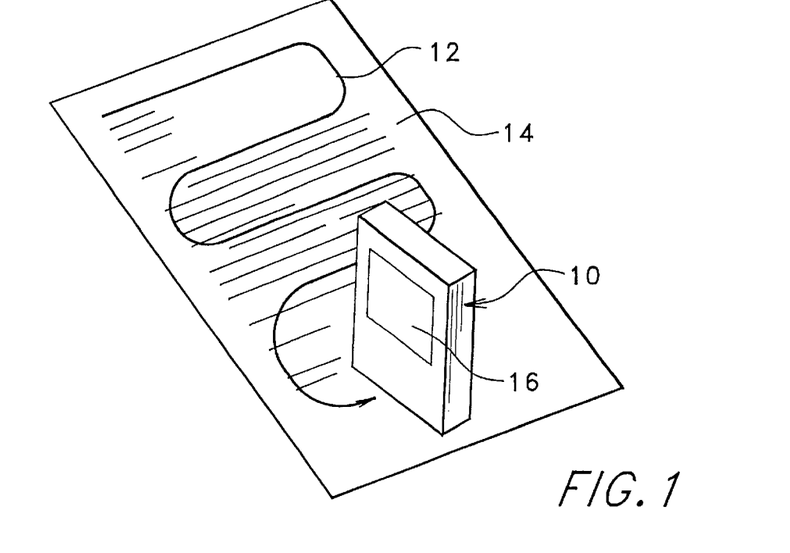
FIG. 1 is a schematic perspective view of a hand-held (portable) optical scanner being moved across a document in a serpentine path.
Figure 2:
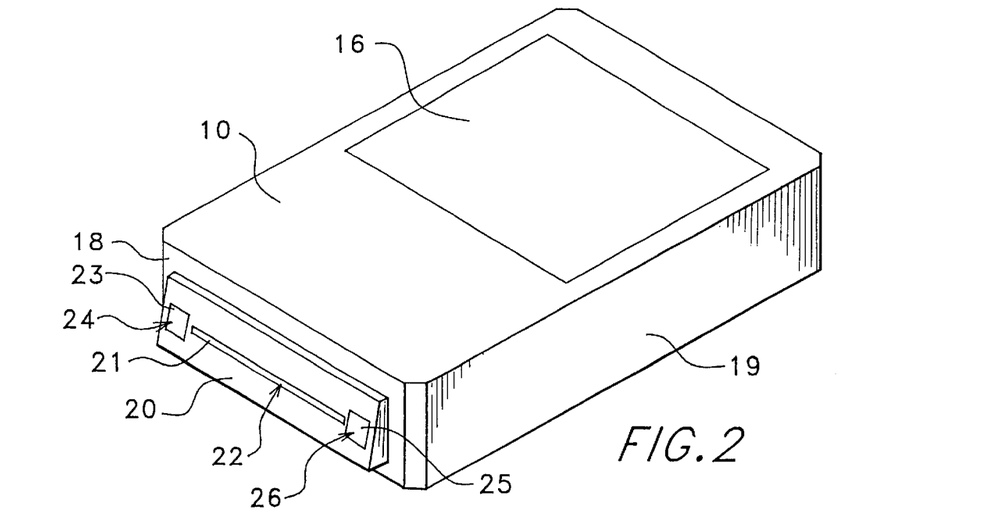
FIG. 2 is a schematic perspective view of the hand-held optical scanner of FIG. 1 positioned to expose a portion of the imaging assembly and navigation assembly thereof.

FIGS. 1 and 2 illustrate a hand-held, portable scanning device 10 of the type which is described in detail in U.S. Pat. No. 5,578,813 issued Nov. 26, 1996 of Allen, et al. and U.S. Pat. No. 5,644,139 issued Jul. 1, 1997 of Allen, et al., both of which are hereby specifically incorporated by reference for all that is disclosed therein. The hand scanner 10 is shown following a meandering path 12 across an original object 14 such as a printed paper document or the like. The scanner 10 may include an image display 16 which enables viewing of the image "scanned" or "captured" by the device.

FIG. 2 shows the end portion 18 of the housing 19 of scanner 10 which is positioned in contact with original 14 as it is scanned. End portion 18 may include a base plate 20 having a plurality of window portions therein. In one embodiment the base plate 20 may pivot relative to the remainder of the scanner housing 19 to facilitate proper contact with the original. Elongated window portion 21 of an imaging assembly 22 extends between window portions 23, 25 of navigation sensor assembly 24, 26.

Figure 3:
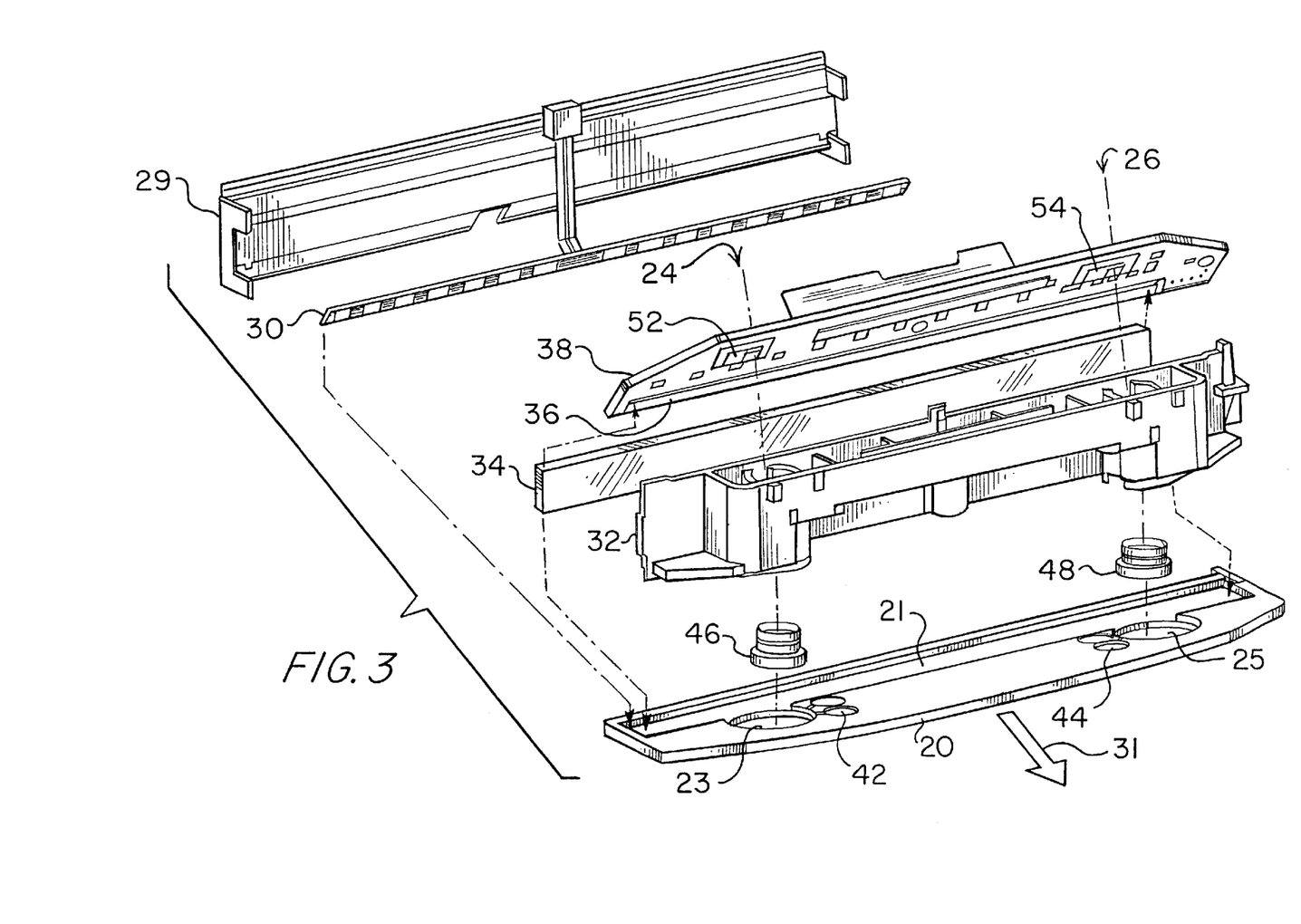
FIG. 3 is an exploded perspective view of one specific embodiment of a hand-held optical scanner of the type shown schematically in FIGS. 1 and 2, showing portions of the imaging assembly and the navigation system thereof.

FIG. 3 shows details of one embodiment of an imaging assembly in a slightly different hand-scanner configuration from that shown in FIGS. 1 and 2 but in which the same reference numerals refer to corresponding components.

Scanner housing 19 may comprise a back panel member 29 adapted to be connected to base plate 20. A light source for the imaging assembly 22 may be a linear LED array 30 which extends perpendicular to scan direction 31 and which may be mounted on an internal structural member 32 at a location above and slightly to one side of imaging window portion 21. Light from the LED array 30 passes through window portion 21, reflects off original 14, FIG. 1, and passes back through window portion 21. The reflected light then passes into an elongated gradient lens assembly 34 supported by member 32 at a location above window portion 21. The gradient lens assembly 34 may have a 1:1 reduction ratio. The lens assembly 34 projects a scan line image of the scanned object (original) 14 onto a linear photosensor array such as a contact image sensor 36 provided on a substrate 38. Substrate 38 may be located on top of structural member 32 with sensor array 36 positioned immediately above lens assembly 34 in contact therewith.

FIG. 3 also shows details of navigation sensor assembly 24, 26. Navigation light sources 42, 44 may be positioned adjacent to each navigation window portion 23, 25 for directing light onto the original 14. The light is reflected from the original 14 back through window portions 23, 25 and thence through navigation lens assemblies 46, 48 onto two-dimensional photosensor arrays 52, 54. As explained in detail in the above reference patents of Allen, et al., the navigation assembly two-dimensional photosensor arrays 52, 54 each capture a two-dimensional image of the portion of the original document 14 which is positioned immediately below window portions 23, 25, respectively. The sensors 52, 54 may be used to capture an image associated with physical characteristics of the document such as, for example, the surface roughness of the paper. Such surface roughness at high resolution may be as distinctive as a mountain range which is imaged by an overflying aircraft.

The navigation sensor assembly 24, 26 sequentially capture images at predetermined intervals which have a fixed relationship to the operating interval of the linear photosensor assembly 36. By comparing the image taken at one operating interval to the image taken at the immediately following operating interval of each navigation sensor 52, 54 the relative linear and rotational displacement of the hand-held scanner 10 may be determined. These comparison calculations may be performed by a central data processor 80 which may comprise a microprocessor, FIG. 4, to which the signals of the navigation sensors 52, 54 are provided.

Figure 4:
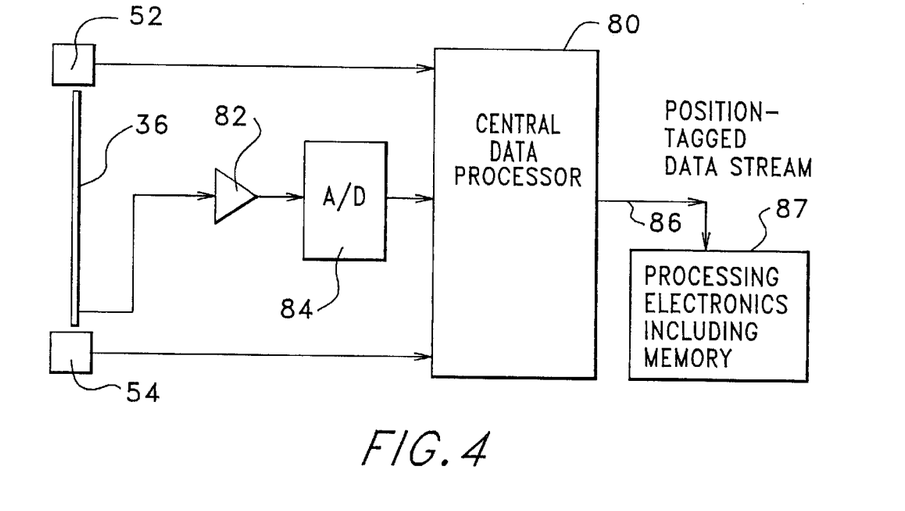
FIG. 4 is a block diagram illustrating the processing of sensor signals from navigation sensors and a linear photosensor array of a hand-held optical scanner.

As previously mentioned, the linear photosensor assembly array 36 captures an image of a scan line portion of the document 14 which is positioned immediately below it during each operating interval. Data from linear photosensor assembly 36 may be passed through an amplifier 82 and convertor 84 and provided to central data processor 80. The data from each operating interval of the linear photo sensor assembly 22 is tagged with position data indicative of the position of the linear photo sensor array on the document during that operating interval. The position data used is generated from the information provided by the navigation sensors 52, 54 during an associated operating interval of the linear photo sensor assembly 22. The position tagged image data stream 86 may thereafter be provided to processing electronics 87 including an image space memory having a plurality of memory locations which are filled with image data in accordance with the position tag applied to that image data. In this manner, image data is properly arranged in memory so as to provide a composite image of the scanned document. As an alternative to position data generated by navigation sensors 52, 54 other types of sensor devices such as, for example, mouse-ball type sensor devices may also be employed to generate data used to tag the image stream from the linear photosensor array 36.

Figure 5:
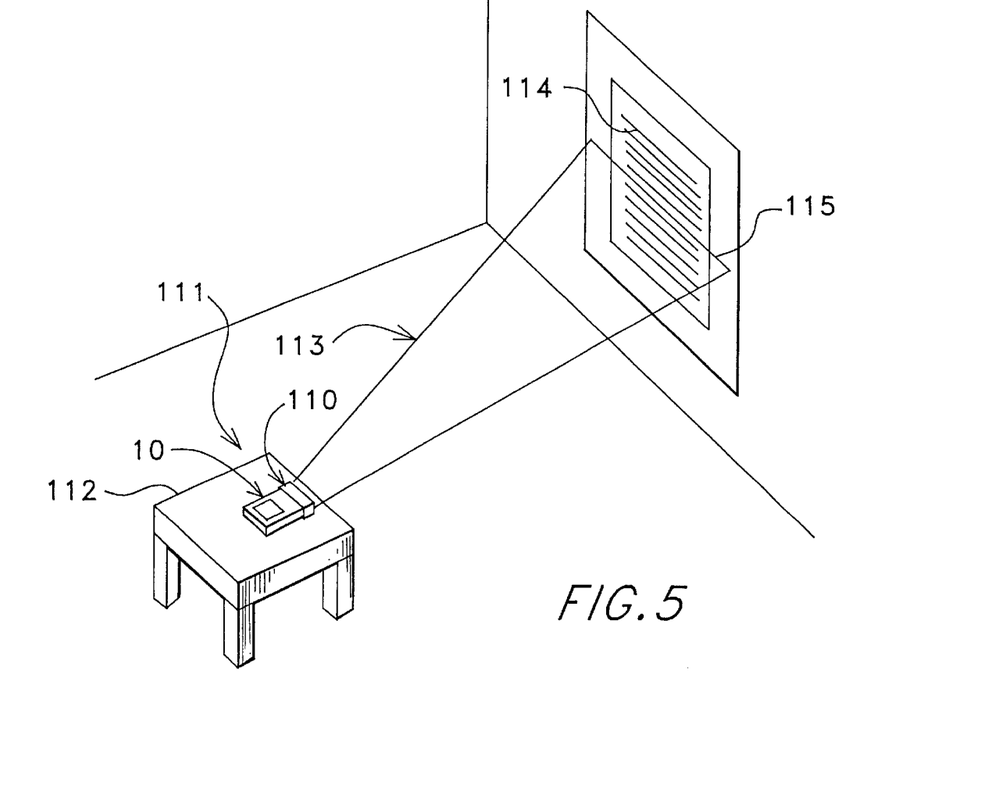
FIG. 5 is a perspective view of a hand-held optical scanner, equipped with a convertor, being used to image a scene positioned remotely from the scanner.

A portable scanner 10 having a converter 110 mounted thereon is illustrated in FIG. 5. This scanner-converter assembly 111 is supported on a table 112 and is used to image a scene 114, such as a whiteboard, remote from the scanner. An imaging light beam 113 extends from a scan line portion 115 of the scene 114 to the linear photosensor 36 of the scanner, FIG. 6. The scan line portion 115 of the scene is thus imaged on the photosensor 36 as indicated at 37. The converter contains a displacement assembly which causes the imaging light beam 113 to be swept across the scene to sequentially image a series of scan line portions of the scene which are converted to electronic data and stored in the scanner memory and which may subsequently be used to generate a complete image of the scene as, for example, on the display screen 16 of the scanner 10 or an associated printer (not shown).

Figure 6:
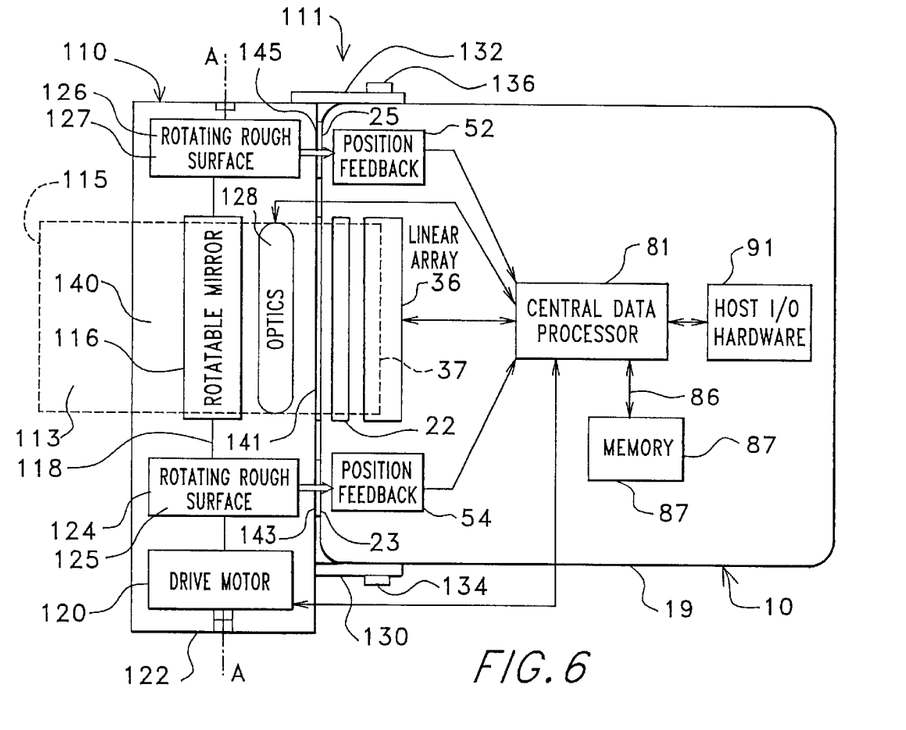
FIG. 6 is a schematic illustration of the operating components of a hand-held optical scanner and the operating components of a convertor for a hand-held optical scanner.
Figure 7:
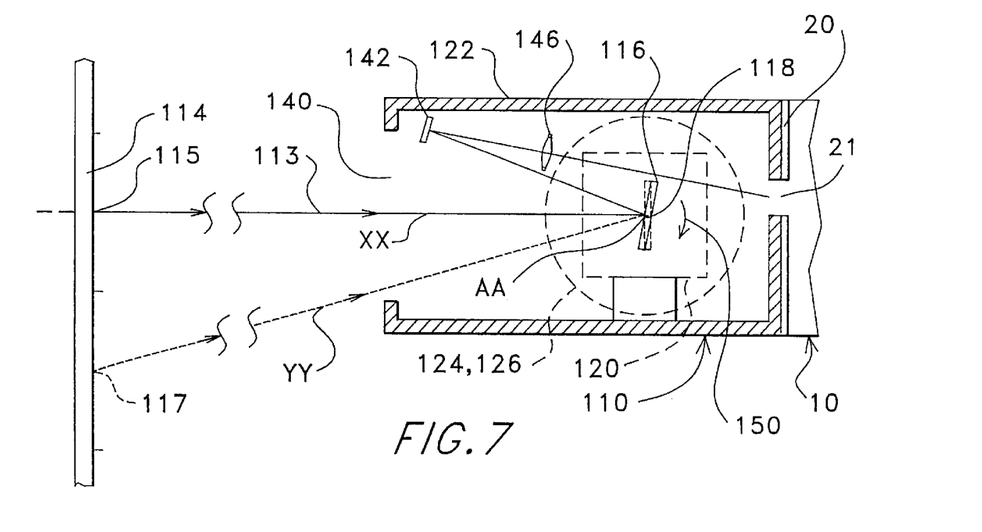
FIG. 7 is a schematic, cross-sectional, side elevation view of one configuration of a convertor for a hand-held optical scanner.

The basic operating components of the converter 110 and the interaction thereof with the operating components of the portable scanner 10 is illustrated schematically in FIGS. 6 and 7.

The converter 110 may be removeably connected to the scanner 10 by any attachment assembly such as for example bracket arms 130, 132 fixedly mounted on converter housing 122. Each bracket arm may have a free end adapted to receive a screw 134, 136 therein. The scanner housing 19 may comprise a pair of threaded holes (not shown) adapted to threadingly receive screws 134, 136 respectively for securing bracket arms 130, 132 to scanner housing 19, thereby holding the converter housing 122 in a predetermined registered relationship with the scanner housing. An other suitable attachment mechanism may also be used.

A light reflecting surface such as a planar mirror 116 or a light refracting surface such as a prism (not shown) is mounted on a rotatable element such as a shaft 118 having an axis of rotation AA extending perpendicular to the ordinary direction of scanning movement 31, FIG. 3, of the scanner. The shaft 118 is operably drivingly connected to a drive motor 120. The motor may be fixedly mounted on a converter housing 122. The shaft 118 may be an extension of the motor drive shaft.

Housing 122 may be constructed for metal, high strength plastic, composite or other suitable material. Housing 122 has a closed generally parallelepiped shaped wall structure with a first opening 140, a second opening 141, a third opening 143, and a fourth opening 145, FIG. 6, therein. First opening 140 is adapted to allow imaging light from remote scene 114 into the housing 122. Second opening 141 is position in alignment with and next adjacent to scanner window 21. Third and fourth openings 143 and 145 are positioned in alignment with and next adjacent to navigation assembly windows 23, 25, respectively.

Wheels 124, 126 may be fixedly mounted on shaft 118. Each wheel may have a rough circumferential surface 125, 127 which is adapted to be sensed through windows in the converter housing and the scanner housing by an aligned two dimensional sensor array 52, 54. The circumferential surfaces have linear velocities proportionate to the rotation rate of shaft 118 and mirror 116.

The imaging light beam 113 from the remote scene 114 passes through converter window 140, FIG. 6, and is reflected from rotatable mirror 116. It then passes through converter optical elements shown schematically at 128 in FIG. 6. The converter optical elements 128 are adapted to coact with the scanner optical elements 22 (shown only in schematic block form in FIG. 6) to produce a focused image 37 of scan line portion 115 on the scanner linear sensor array 36. One embodiment of the converter optical elements 128 is illustrated in FIG. 7. In that embodiment the optical elements comprise a fixed mirror 142 and a fixed lens element 146 both having lengths extending parallel to the length of the linear sensor array 36 and rotation axis AA (i.e. into the sheet in FIG. 7). Rotating mirror 116 and fixed mirror 142 coact to fold the path of imaging light beam 113. In an embodiment in which the optical scanner 10 employs a gradient lens type optical system, as shown in FIG. 3, the lens 122 may have a length approximately equal to the length of the gradient lens 34. The combined optical effect of lens 122 and gradient lens 34 is to produce a focused image of a subject scan line 115 on the linear sensor array 36. The reduction ratio of object size to image size is dependent in part upon the ratio of the length of the portion of the imaging light beam 115 between the scene 114 and lens 146 and the length of the imaging light beam portion between lens 146 and the scanner window portion 21. In one preferred embodiment the reduction ratio for an imaged scene located 10 feet away from the converter 110 may be 10:1.

In operation mirror 116 is rotated about axis AA of shaft 118, thereby causing a series of scan line portions 115, 117, etc. of remote scene 114 to be sweepingly imaged on linear photosensor array 36. FIG. 7 shows one rotational position of the mirror 116 and the corresponding imaging light path 113 along axis XX from one scan line portion 115 of the scene 114 in solid lines and shows another rotational position of the mirror 116 and the corresponding imaging light path 113 along axis YY from another scan line portion 117 of the scene 114 in dashed lines. The amount that the mirror must be angularly displaced in order to completely scan a distant scene depends of course on the size of the scene to be scanned and the distance of the scene from the scanner 10. However it is generally desirable to, at least initially, scan each scene with the same amount of angular displacement of the mirror 16. One exemplary amount of displacement is 45 degrees. To perform a scan the mirror is initially positioned at the location indicated by axis YY in FIG. 7. The mirror is then rotated in mirror rotation direction 150 through the position indicated at XX to an end of cycle position (axis not shown) above axis XX. The end of cycle position may be displaced angularly from XX by an amount equal to the angle formed by xx and YY.

During angular displacement of the mirror the scanner navigation assembly sequentially images at least one of the wheels 124, 126 with at least one of its navigation sensors 52, 54 and generates position data in the same manner that the navigation system generates position data when the scanner is moved across a document. This changing position data indicates the circumferential displacement of the associated wheel 124, 126. The diameter of the wheels are known, thus this circumferential position/displacement data generated by the navigation sensors may be used to determine the circumferential displacement of the wheels and thence the angular position/displacement of shaft 118 and mirror 116. Mirror angular position coordinates determined during a subject operating interval of the scanner linear photosensor 36 are used to tag the data from the linear photosensor during that operating interval in the same manner that rectangular coordinates from the navigation sensor assembly are use to tag linear photosensor data during hand scanning. The data tagging task is simplified when using the converter 110 because motion occurs in only one dimension. Thus information from only one of the navigation sensors is required for generating the tagging data. The tagging coordinate information is used to properly order the tagged linear photosensor data in memory to enable generation of a composite image of the scanned scene in the same manner that tagged data is used in hand scanning. (As an alternative to using navigation sensors 52, 54 for generating mirror angular position data, motor 120 may be a stepper motor assembly which provides an output signal to central data processor 81 and which is, in turn, controlled by command signals from processor 81. The stepper motor assembly output signal is indicative of the angular position of mirror 116.)

During converter operation the position data is also put to another use. It is used to determine when the shaft has reached the end of its displacement cycle and thus when to terminate motor displacement in a direction 150. After displacement in direction 150 has been stopped the motor is operated in the reverse direction until the mirror 116 has been rotated to the start-cycle angular position shown in dashed lines in FIG. 7. (Alternatively, the mirror 116 could continue rotating in direction 150 until reaching the start cycle position.) The navigation sensor signals (or stepper motor signals) are again used to determine when the start-cycle operating position has been reached at which point the motor operation is again terminated. The mirror then remains in this position until the beginning of the next scanning session at which time it is again displaced in direction 150.

In the embodiment of the converter 110 illustrated in FIG. 7, the opening or window 140 which allows imaging light to enter the converter housing is positioned diametrically opposite (along axis XX) the opening 141 through which imaging light passes to leave the converter and enter the scanner window 21. In the embodiment of the converter 110 illustrated in FIG. 8, the opening 141 which is positioned next to scanner window 21 faces perpendicular to the direction in which opening 140 faces. In this arrangement mirror 116, as in the previous embodiment, is rotated to produce a sweeping scan line image on the linear sensor (not shown in FIG. 8) but mirror 142 may be eliminated. Also in FIG. 8, fixed lens 146 has been replaced by a zoom lens assembly 148 positioned in opening 140. Zoom lens 148 may be conventionally manually operated to increase or decrease the size of the scan line image which is focused on linear sensor 36. Angular position sensing and data tagging of scan lines may be the same as described with reference to FIGS. 6 and 7 above.

Figure 9:
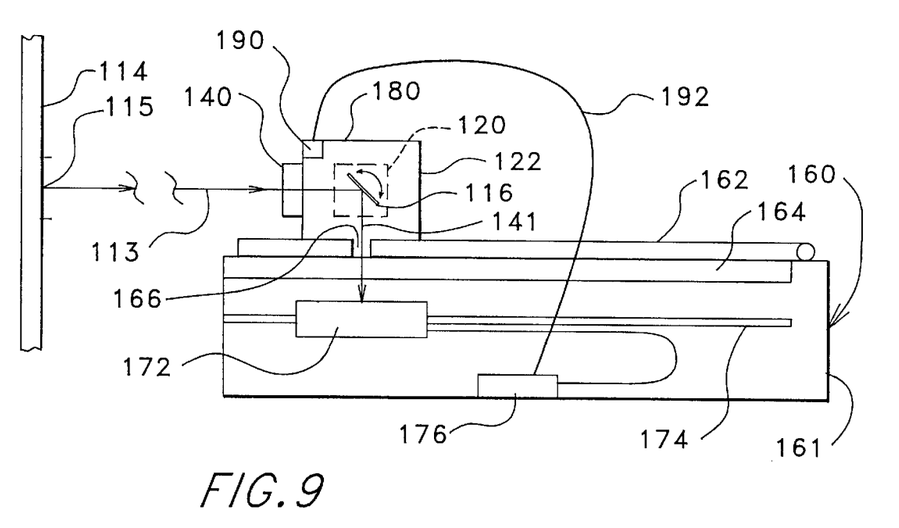
FIG. 9 is a schematic, cross-sectional, side elevation view of a flat bed scanner equipped with a convertor being used to scan a scene positioned remote from the flat bed scanner.

FIG. 9 illustrates a flat bed scanner 160 having a housing 161 and a cover 162 which covers the scanner platen or transparent plate 164. The cover has an opening 166 extending perpendicular to the scanning direction and extending entirely through the cover 162. This opening is covered by a plug (not shown) or other light blocking structure during ordinary scanner operation. However when this flat bed scanner is used with a converter 180 opening 166 is uncovered. The flat bed scanner further includes a scanner imaging carriage 172 which is ordinarily displaceable along parallel rails 174 (only one shown) to produce displacement between the imaging assembly 172 and a document (not shown) placed on the platen 164. The carriage assembly includes an optical imaging assembly and a linear photosensor assembly (not shown) which may be the same or similar to those of the flat bed scanner patents incorporated by reference above, which coact to scan a document placed on the scanner platen. Alternatively, the scanner may be of the type having a "trombone" type light path and in which the photosensor assembly is positioned in a fixed location remote from the scanner carriage, as is conventional and known in the art. The scanner 160 has a central processing unit which processes data signals received from a linear photosensor assembly and thereafter transmits processed data signals representative of the scanned document to a memory or display device as is well known in the art.

Figure 8:
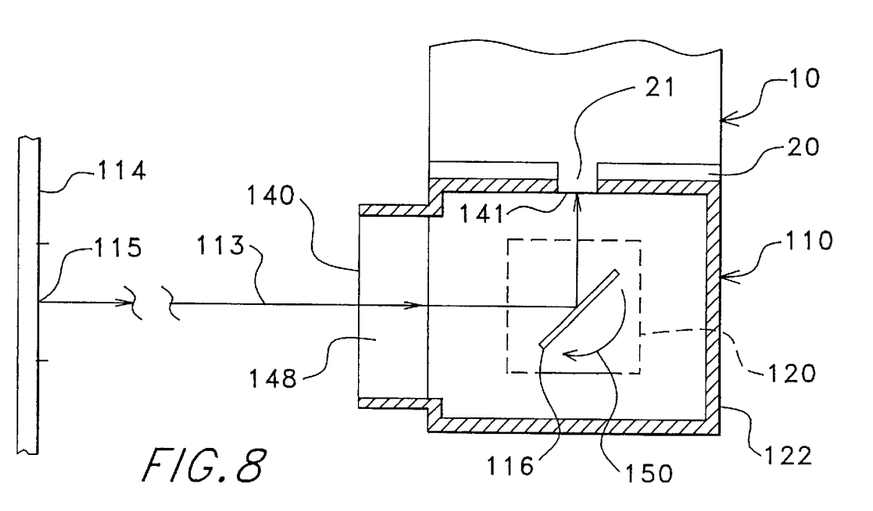
FIG. 8 is a schematic, cross-sectional, side elevation view of another embodiment of a convertor for a hand-held optical scanner.

In the illustration of FIG. 9, a converter 180 is provided which may have the same components shown in FIG. 8 except that the converter mirror drive motor 120 is a stepper motor which includes a stepper motor angular position sensor 190. The converter is mounted in stationary relationship with the scanner 160 on top of cover 162 with imaging light exit opening 141 of the scanner aligned with slit 166 of the cover and coextensive therewith. The scanner 160 may be provided with appropriate circuitry/software and a selection device, such as a push-button (not shown) for parking the scanner carriage 172 directly beneath slit 166 and initiating converter mode operation of the scanner. An electrical lead 192 is operably connected between the converter stepper motor angular position sensor 190 and the scanner central processing unit 176 to provide a signal to the processing unit 176 indicative of scanner mirror position and to provide command signals to actuate the stepper motor. The signal provided by position sensor 190 replaces the position feedback signals from navigation sensors as described above. The processing unit 176 may thus operate in the same manner as central data processor 81 described above in order to generate image data representative of a remote scene 114.

Figure 10:
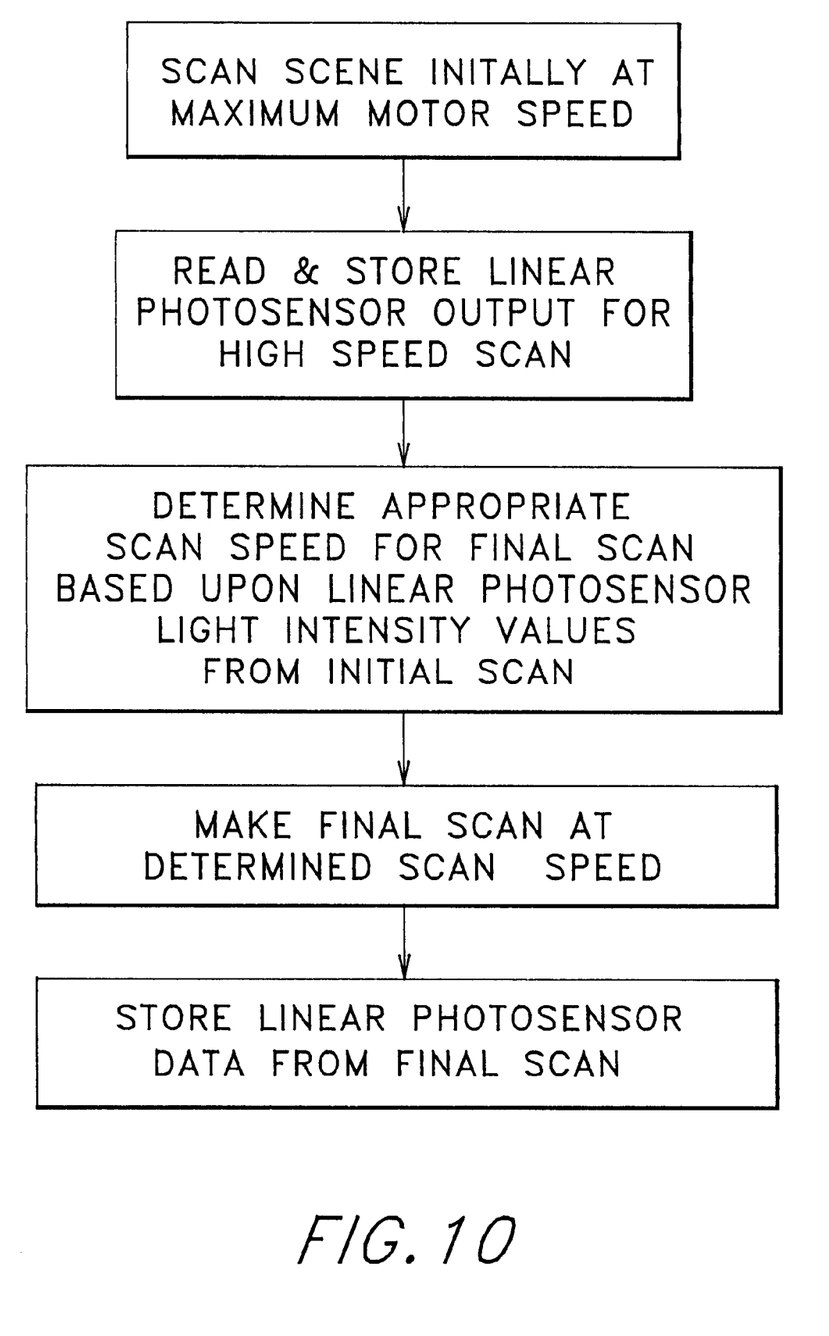
FIG. 10 is a block diagram showing a light calibration process performed by an optical scanner equipped with a convertor.

The scanner converters 110 and 190 described above may be operated at a single, preset operating speed which takes into account worst case lighting conditions. However the converters may also be configured to operate at a plurality of different operating speeds which are selected based upon current lighting conditions. This speed selection is done, as indicated in FIG. 10, by performing an initial fast scan and using the photosensor light intensity values from that fast scan to determine current lighting conditions and then choosing the optimum speed for the final scan based upon predetermined look-up table values or the like.

It is contemplated that the inventive concepts herein described may be variously otherwise embodied and it is intended that the appended claims be construed to include alternative embodiments of the invention, except insofar as limited by the prior art.

What is claimed is:

1. A converter for converting an optical scanner of the type having a scanner linear photo sensor array and a scanner imaging assembly, which normally images a moving scan line portion of an object in contact with the scanner onto the linear photo sensing array, into a remote object scanner, comprising:

a converter imaging assembly having at least one optical element which cooperates with the scanner imaging assembly to image a scan line portion of a scene remote from said optical scanner onto said scanner linear photo sensor array; said converter being removably attachable to said optical scanner.

2. The converter of claim 1 further comprising: a converter displacement assembly which displaces at least one optical element of said converter imaging assembly to sweepingly change said scan line portion of the scene which is imaged on the linear photo sensor array without moving the optical scanner with respect to the scene.

3. The converter of claim 2 wherein the optical scanner is a portable scanner adapted to be moved over the surface of an object to scan the object, the portable scanner comprising a scanner navigation sensor assembly which senses movement of the portable scanner over the scanned object and a data processor which receives and processes data from the linear photo sensor array and the navigation sensor assembly, and comprising: a scan line displacement sensing assembly which senses said sweeping change of said scan line portion of the scene and generates a sensing signal representative thereof which is provided to the portable scanner data processor.

4. The converter of claim 3 wherein said scan line displacement sensing assembly comprises a stepper motor.

5. The converter of claim 4 wherein said stepper motor comprises a portion of said converter displacement assembly.

6. The converter of claim 3 wherein said scan line displacement sensing assembly comprises at least a portion of said scanner navigation sensor assembly.

7. The converter of claim 6 wherein said scanner navigation assembly comprises a surface sensing, optical navigation sensor assembly and further comprising a rotating surface having a surface speed dependent upon said scan line sweep rate disposed in surface detectable relationship with said optical navigation sensor assembly.

8. The converter of claim 3, said portable scanner comprising a scanner housing which houses said scanner linear photo sensor array, said scanner imaging assembly, said scanner navigation sensor assembly, and said scanner data processor, said converter comprising a converter housing which houses said converter imaging assembly and said converter displacement assembly, said converter housing being removably attachable to said scanner housing.

9. The converter of claim 2, said at least one optical element of said converter imaging assembly comprising a mirror.

10. The converter of claim 1, said at least one optical element of said converter imaging assembly comprising a lens assembly.

11. The converter of claim 10, said lens assembly comprising a fixed lens assembly which cooperates with the scanner optical system to provide a focused image of said scan line portion of the scene on said linear photo sensor array.

12. The converter of claim 10, said lens assembly comprising a displaceable lens assembly which cooperates with the scanner optical system to provide a focused image of said scan line portion of the scene on said linear photo sensor array at a selectively variable reduction ratio.

13. A method of using a scanner, which is ordinarily used to scan an object in contact with the scanner, to scan a scene which is positioned remotely from the scanner comprising:

maintaining said scanner at a fixed position relative to said scene and, through use of a removably attached converter, directing imaging light reflected from a first portion of said scene onto a predetermined portion of said scanner; and while maintaining said scanner at said fixed position relative to said scene, through use of a removably attached converter, directing imaging light reflected from a second portion of said scene adjacent to said first portion of said scene onto said predetermined portion of said scanner.

14. The method of claim 13, further comprising: sensing relative displacement between said first portion of said scene and said second portion of said scene.

15. The method of claim 14 wherein said sensing of displacement comprises sensing of displacement with a scanner onboard navigation sensor assembly which is ordinarily used to sense displacement of the scanner over the surface of a document positioned in contact with the scanner.

16. The method of claim 14 wherein said sensing of displacement comprises sensing displacement of a stepper motor which displaces an optical component lying in the path of light reflected from the scene and impinged upon said predetermined portion of said scanner.

17. The method of claim 14 comprising generating image data representative of said first portion of said scene and generating image data representative of said second portion of said scene and processing and storing said image data based upon the sensed displacement between said first and second portions of said scene.

18. The method of claim 14 comprising displacing an optical component to change the portion of the scene which is imaged on said predetermined portion of said scanner.

19. The method of claim 18 wherein sensing relative displacement between said first portion of said scene and said second portion of said scene comprises sensing the displacement of the optical element.

20. The method of claim 14 wherein sensing the displacement of the optical element comprises sensing displacement of a rotating object mechanically linked to the optical element with a hand scanner navigation sensor assembly ordinarily used to sense scanner displacement relative to a scanned object.

21. A method of converting an object contacting optical scanner of the type having a linear photo sensor array and an imaging assembly which normally images a moving scan line portion of an object contacting the scanner onto the linear photo sensor array, into a remote scene scanner comprising removably attaching to the optical scanner a converter imaging assembly having at least one optical element which cooperates with the scanner imaging assembly to image a scan line portion of a scene remote from said optical scanner onto said scanner linear photo sensor.

* * * * *